US008276005B2

(12) United States Patent
Bae et al.

(10) Patent No.: US 8,276,005 B2
(45) Date of Patent: Sep. 25, 2012

(54) DIGITAL IMAGE TRANSMISSION SYSTEM TRANSMITTING DIGITAL IMAGE DATA

(75) Inventors: Tae-Hoon Bae, Seongnam (KR); Won-Seok Jung, Hwaseong-si (KR)

(73) Assignee: Opticis Co., Ltd., Seongnam-Si, Gyeonggi-Do (KR)

( * ) Notice: Subject to any disclaimer, the term of this patent is extended or adjusted under 35 U.S.C. 154(b) by 455 days.

(21) Appl. No.: 12/663,518

(22) PCT Filed: Jun. 5, 2008

(86) PCT No.: PCT/KR2008/003157
§ 371 (c)(1), (2), (4) Date: Dec. 7, 2009

(87) PCT Pub. No.: WO2008/150116
PCT Pub. Date: Dec. 11, 2008

(65) Prior Publication Data
US 2010/0165189 A1 Jul. 1, 2010

(30) Foreign Application Priority Data
Jun. 7, 2007 (KR) ........................ 10-2007-0055710

(51) Int. Cl.
*G06F 1/00* (2006.01)

(52) U.S. Cl. ............ 713/300; 713/340; 714/14; 714/22; 345/204; 345/211

(58) Field of Classification Search .............. 713/1, 300, 713/310, 320, 340; 710/62, 65, 302, 316; 714/14, 22; 348/720, 723, 725, 372, 374, 348/375; 345/204, 211
See application file for complete search history.

(56) References Cited

U.S. PATENT DOCUMENTS 5,465,926 A 11/1995 Brown
5,761,084 A * 6/1998 Edwards ........................ 700/293
6,087,804 A * 7/2000 Suda ............................ 320/106
(Continued)

FOREIGN PATENT DOCUMENTS

DE 112008000138 T5 2/2010
(Continued)

OTHER PUBLICATIONS

Hitachi, Ltd. et al. High-Definition Multimedia Interface. Specification. Version 1.1. May 20, 2004.*

(Continued)

*Primary Examiner* — Matthew D Spittle
(74) *Attorney, Agent, or Firm* — Nixon Peabody LLP

(57) ABSTRACT

Provided is a digital image transmission system in a high definition multimedia interface (HDMI) format or a digital visual interface (DVI) format. A transmission and reception reinforcement device of the digital image transmission system includes a transmitter, a receiver, and a power supply circuit. The power supply circuit includes a first power supply unit supplying power to the transmitter and a second power supply unit supplying power to the receiver. Power output terminals of the first and second power supply units are connected to each other. External-power supply voltages respectively input to the first and second power supply units are output to the power output terminals. When all of the external-power supply voltages input to the first and second power supply units are lower than a predetermined voltage, an internal-power supply voltage present in a communication line between the host device and the display device is output to the power output terminals.

12 Claims, 6 Drawing Sheets

U.S. PATENT DOCUMENTS 6,125,448 A * 9/2000 Schwan et al. ................ 713/300
6,125,455 A * 9/2000 Yeo ................................ 714/14
6,963,933 B2 * 11/2005 Saito et al. ........................ 710/1
6,963,968 B2 * 11/2005 Kori .................................. 713/1
7,000,123 B2 * 2/2006 Mariaud et al. ............... 713/300
7,046,294 B1 * 5/2006 Sasaki ........................... 348/372
7,154,553 B2 * 12/2006 Horii et al. .................... 348/372
7,269,673 B2 * 9/2007 Kim et al. ....................... 710/72
7,343,506 B1 * 3/2008 Fenwick ....................... 713/340
7,363,525 B2 * 4/2008 Biederman et al. ........... 713/340
7,406,607 B2 * 7/2008 Echizenya .................... 713/300
7,421,290 B2 * 9/2008 Lehr et al. ..................... 455/572
7,424,569 B2 * 9/2008 Matsuda ....................... 710/316
7,451,328 B2 * 11/2008 Hsieh ............................ 713/300
7,454,641 B2 * 11/2008 Connor et al. ................ 713/324
7,484,109 B2 * 1/2009 Feldman et al. .............. 713/300
7,523,241 B2 * 4/2009 Konishi ........................ 710/302
7,609,255 B2 * 10/2009 Frederick et al. ............. 345/211
7,620,846 B2 * 11/2009 Biederman et al. ............. 714/14
7,646,214 B2 * 1/2010 Smith ............................. 326/30
7,908,414 B2 * 3/2011 Combs et al. ................... 710/62
7,911,530 B2 * 3/2011 Sawachi ........................ 348/372
7,941,677 B2 * 5/2011 Penning ........................ 713/300
8,028,175 B2 * 9/2011 Diab et al. .................... 713/300
8,046,619 B2 * 10/2011 Newland et al. .............. 713/340
8,051,308 B2 * 11/2011 Hsieh ............................ 713/300
8,054,601 B2 * 11/2011 Udagawa ........................ 361/92
8,106,630 B2 * 1/2012 Tupman et al. ............... 320/132
2003/0011704 A1 * 1/2003 Sawachi ........................ 348/372
2003/0107566 A1 * 6/2003 Shin et al. ..................... 345/212
2003/0110403 A1 * 6/2003 Crutchfield et al. .......... 713/300
2005/0003795 A1 * 1/2005 Lehr et al. ..................... 455/402
2005/0141851 A1 * 6/2005 Nakayama et al. ............. 386/46
2006/0208929 A1 * 9/2006 Cho ................................ 341/50
2007/0106913 A1 * 5/2007 Lewis et al. ................... 713/300
2009/0150589 A1 * 6/2009 Watarai et al. ................ 710/302
2009/0217088 A1 * 8/2009 Diab ............................... 714/14
2010/0060784 A1 * 3/2010 Ansari .......................... 348/441
2010/0132001 A1 * 5/2010 Kitano et al. ................. 725/118
2010/0135429 A1 * 6/2010 Nakajima ..................... 375/295
2010/0259691 A1 * 10/2010 Sasazaki ....................... 348/723
2011/0068736 A1 * 3/2011 Chartier et al. ............... 320/107
2011/0084685 A1 * 4/2011 Zhong et al. ............... 324/76.11
2011/0113264 A1 * 5/2011 Kim .............................. 713/300

FOREIGN PATENT DOCUMENTS

JP 10-145299 A 5/1998
JP 10145299 A 5/1998
JP 10-240386 A 9/1998
JP 10240386 A 9/1998
WO 00/50971 A 8/2000
WO 2008/084936 A1 7/2008

OTHER PUBLICATIONS

Emcore Corporation. VX-1HDMI-IR. HDMI with IR Fiber Optic Extender. Datasheet. 2012.*

Gefen, LLC. HDMI CAT5 Extreme. User Manual. 2010.*

International Search Report, PCT/KR2008/003157, dated Nov. 13, 2008.

German Office Action in German Application No. 112008001547.3, dated Oct. 4, 2011.

* cited by examiner 32
321
LIGHT-RECEIVING AMPLIFIER
RECEIVER
322
31
311
LIGHT-EMITTING DRIVER
TRANSMITTER
312
SR
SG
SB
CLK
SCL
SDAR
SDAL
+5V
GND
HPD
VCC
VEXT2
PSC1
VCC1
VCC2
VEXT1
VEXT2

61
611
TMDS AMPLIFIER
613
I²C BUFFER
TRANSMITTER
612
VCC1
VEXT1
62
621
TMDS LIMIT AMPLIFIER
623
I²C BUFFER
RECEIVER
622
VCC2
VEXT2
SR+
SR-
SG+
SG-
SB+
SB-
CLK+
CLK-
SCL
SDA
+5V
GND
HPD
VCC
VEXT2
PSC3

DIGITAL IMAGE TRANSMISSION SYSTEM TRANSMITTING DIGITAL IMAGE DATA

CROSS REFERENCE TO RELATED APPLICATIONS OR PRIORITY CLAIM

This application is a national phase of International Application No. PCT/KR2008/003157, entitled "DIGITAL IMAGE TRANSMISSION SYSTEM TRANSMITTING DIGITAL IMAGE DATA", which was filed on Jun. 5, 2008, and which claims priority of Korean Patent Application No. 10-2007-0055710, filed Jun. 7, 2007, the contents of which are incorporated herein by reference.

DESCRIPTION

1. Technical Field

The present invention relates to a digital image transmission system transmitting digital image data, and more particularly, to a digital image transmission system in a high definition multimedia interface (HDMI) format or a digital visual interface (DVI) format.

2. Background Art

FIG. 1 illustrates a conventional digital image transmission system in a high definition multimedia interface (HDMI) format. Referring to FIG. 1, the conventional digital image transmission system in an HDMI format comprises a host device 11, a display device 12, and electrical cables. Here, the electrical cables are connected between input/output terminals $T_{H1}$ to $T_{H14}$ of the host device 11 and input/output terminals $T_{D1}$ to $T_{D14}$ of the display device 12.

The host device 11 comprises an HDMI transmitter 111 and a graphic controller 112. The display device 12 comprises a serial electrically erasable and programmable read only memory (EEPROM) 122 and an HDMI receiver 121.

The HDMI transmitter 111 in the host device 11 converts audio data $S_{AUD}$, a clock signal $S_{CS}$, and digital image data $S_{VID}$ into transition minimized differential signaling (TMDS) signals according to the HDMI format and transmits the TMDS signals to the display device 12.

More specifically, audio data $S_{AUD}$ and digital image data $S_{VID}$ are processed by the HDMI transmitter 111 and are output as 2 channels of red signals $S_{R+}$ and $S_{R-}$, 2 channels of green signals $S_{G+}$ and $S_{G-}$, and 2 channels of blue signals $S_{B+}$ and $S_{B-}$. The clock signal $S_{CS}$ are processed by the HDMI transmitter 111 and are output as 2 channels of clock signals CLK+ and CLK−.

The serial EEPROM 122 in the display unit 12 stores extended display identification data (EDID) of the display device 12 and transmits EDID to the graphic controller 112 in the host device 11 according to Inter-Integrated circuit ($I^2C$) communication protocol.

In I2C communication, the graphic controller 112 transmits a clock signal SCL to the serial EEPROM 122 and transmits and receives a data signal SDA to and from the serial EEPROM 122. The graphic controller 112 supplies a power supply potential +5V and a ground potential GND to the EEPROM 122 so as to perform the operation of the serial EEPROM 122. The display device 12 applies a voltage HPD for hot plug detect (HPD) to the graphic controller 112, thereby detecting that the graphic controller 112 is connected to the display device 12. Unused preparatory terminals $T_{H14}$ and $T_{D14}$ are called no connection (NC) terminals.

The graphic controller 112 in the host device 11 controls the operation of the HDMI transmitter 111 according to EDID.

The HDMI receiver 121 in the display device 12 restores the TMDS signals in the HDMI format output by the host device 11 into audio data $S_{AUD}$, the clock signal $S_{CS}$, and digital image data $S_{VID}$.

FIG. 2 illustrates a conventional digital image transmission system in a digital visual interface (DVI) format. In FIG. 2, like reference numerals as those of FIG. 1 denote elements having same functions. Only differences between the digital image transmission systems of FIGS. 1 and 2 will now be described. Referring to FIG. 2, the conventional digital image transmission system in a DVD format comprises a host device 21, a display device 22, and electrical cables. Here, the electrical cables are connected between input/output terminals $T_{H1}$ to $T_{H14}$ of the host device 21 and input/output terminals $T_{D1}$ to $T_{D14}$ of the display device 22.

The host device 21 comprises a TMDS transmitter 211 and a graphic controller 212. The display device 22 comprises a serial EEPROM 222 and a TMDS receiver 221.

The TMDS transmitter 211 in the host device 21 converts a clock signal $S_{CS}$ and digital image data $S_{VID}$ into TMDS signals to correspond to the DVI format and transmits the TMDS signals to the display device 22.

The serial EEPROM 222 in the display unit 22 stores EDID of the display device 22 and transmits EDID to the graphic controller 212 in the host device 21 according to $I^2C$ communication protocol.

The graphic controller 212 in the host device 21 controls the operation of the TMDS transmitter 211 according to EDID.

The TMDS receiver 221 in the display device 22 restores TMDS signals in the DVI format output by the host device 21 into the clock signal $S_{CS}$ and digital image data $S_{VID}$.

In the digital image transmission system of FIG. 1 or 2, the longest distance that can be employed between the host device 21 and the display device 22 is limited to approximately 10 m. When a distance between the host device 21 and the display device 22 is long than that, a transmission and reception reinforcement device, such as an optical cable module or a repeater, is needed.

The transmission and reception reinforcement device comprises a transmitter and a receiver. The transmitter is coupled to the host device 11 or 21, the receiver is coupled to the display device 12 or 22, and a communication line is connected between the transmitter and the receiver. Here, each of the transmitter and the receiver operates due to their own external power supply.

Thus, in the transmission and reception reinforcement device of the digital image transmission system having the above structure, due to the difference between a first external-power supply voltage supplied to the transmitter and a second external-power supply voltage supplied to the receiver, the operation of the transmitter and the operation of the receiver may be unbalanced. In this case, data collision may occur between the transmitter and the receiver.

In addition, when external power of the transmission and reception reinforcement device is weakened, transmission of digital image data is not smoothly performed, and when the external power is cut off, transmission of digital image data is not possible.

DETAILED DESCRIPTION OF THE INVENTION

Technical Problem

The present invention provides a digital image transmission system transmitting digital image data to a display device, wherein transmitting of digital image data is performed by a host device by using a transmission and reception reinforcement device and data collision that may occur between a transmitter and a receiver of the transmission and reception reinforcement device is prevented and transmission of digital image data is smoothly performed even if the external power supply of the transmission and reception reinforcement device is weakened or cut off.

Technical Solution

According to an aspect of the present invention, there is provided a digital image transmission system comprising a host device, a transmission and reception reinforcement device, and a display device. The host device may transmit digital image data to the display device by using the transmission and reception reinforcement device.

The transmission and reception reinforcement device may include a transmitter, a receiver, and a power supply circuit.

The power supply circuit may include a first power supply unit supplying power to the transmitter and a second power supply unit supplying power to the receiver. Power output terminals of the first and second power supply units may be connected to each other. External-power supply voltages respectively input to the first and second power supply units may be output to the power output terminals.

When all of the external-power supply voltages input to the first and second power supply units are lower than a predetermined voltage, an internal-power supply voltage present in a communication line between the host device and the display device may be output to the power output terminals.

Advantageous Effects

In the digital image transmission system according to the present invention, power output terminals of first and second power supply units of the transmission and reception reinforcement device are connected to each other. As such, even if there is a difference between a first external-power supply voltage supplied to a transmitter and a second external-power supply voltage supplied to a receiver, the one having higher voltage of the first external-power supply voltage and the second external-power supply voltage is supplied to each of the transmitter and the receiver, such that the operation of the transmitter and the operation of the receiver can be balanced. Thus, data collision between the transmitter and the receiver can be prevented.

When all of external-power supply voltages input to the first and second power supply units are lower than a predetermined voltage, the transmitter and the receiver of the transmission and reception reinforcement device operate due to an internal-power supply voltage. As such, even if an external power supply of the transmission and reception reinforcement device is weakened or cut off, transmission of digital image data can be smoothly performed.

BEST MODE

Figure 1:
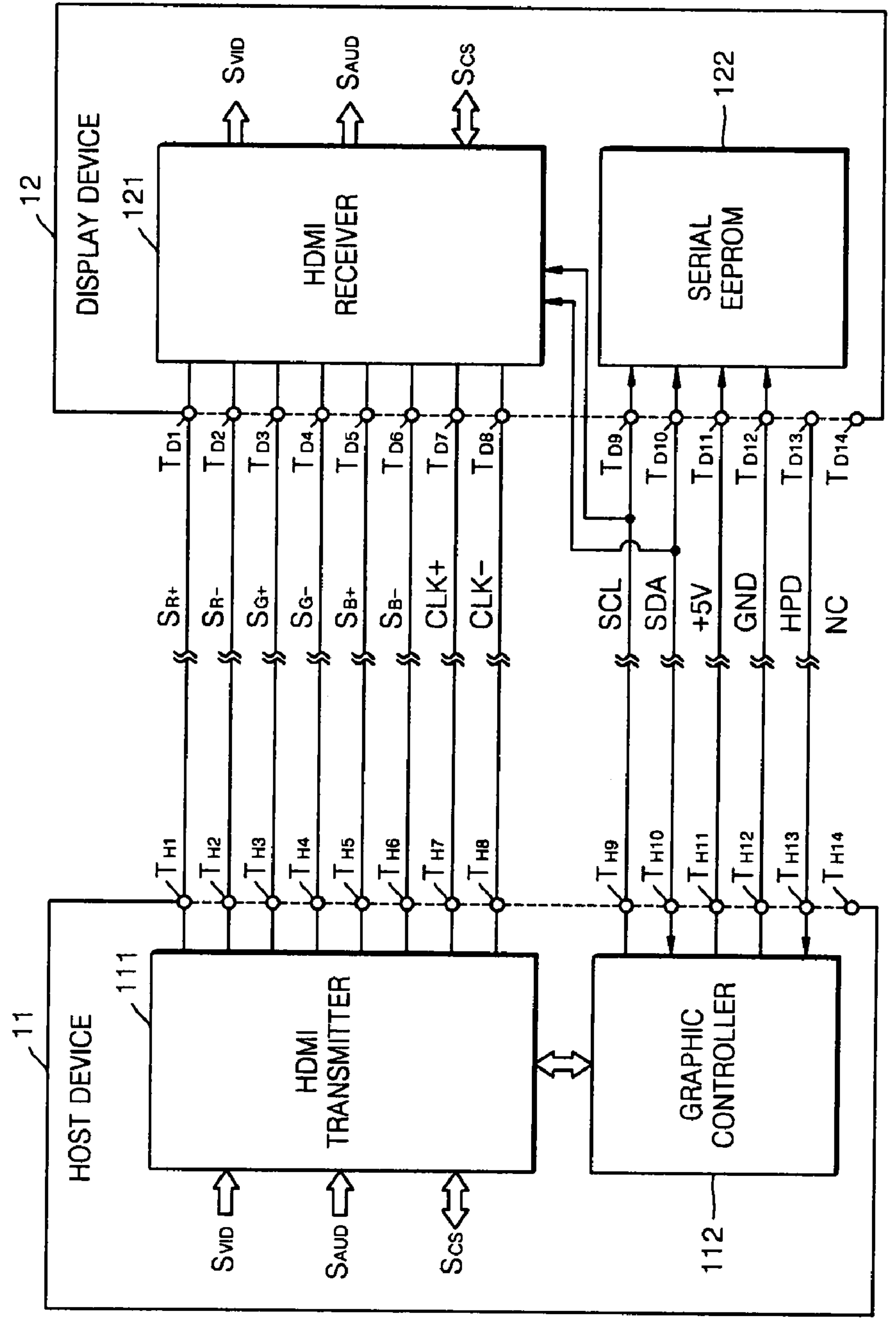
FIG. 1 illustrates a conventional digital image transmission system in a high definition multimedia interface (HDMI) format.
Figure 2:
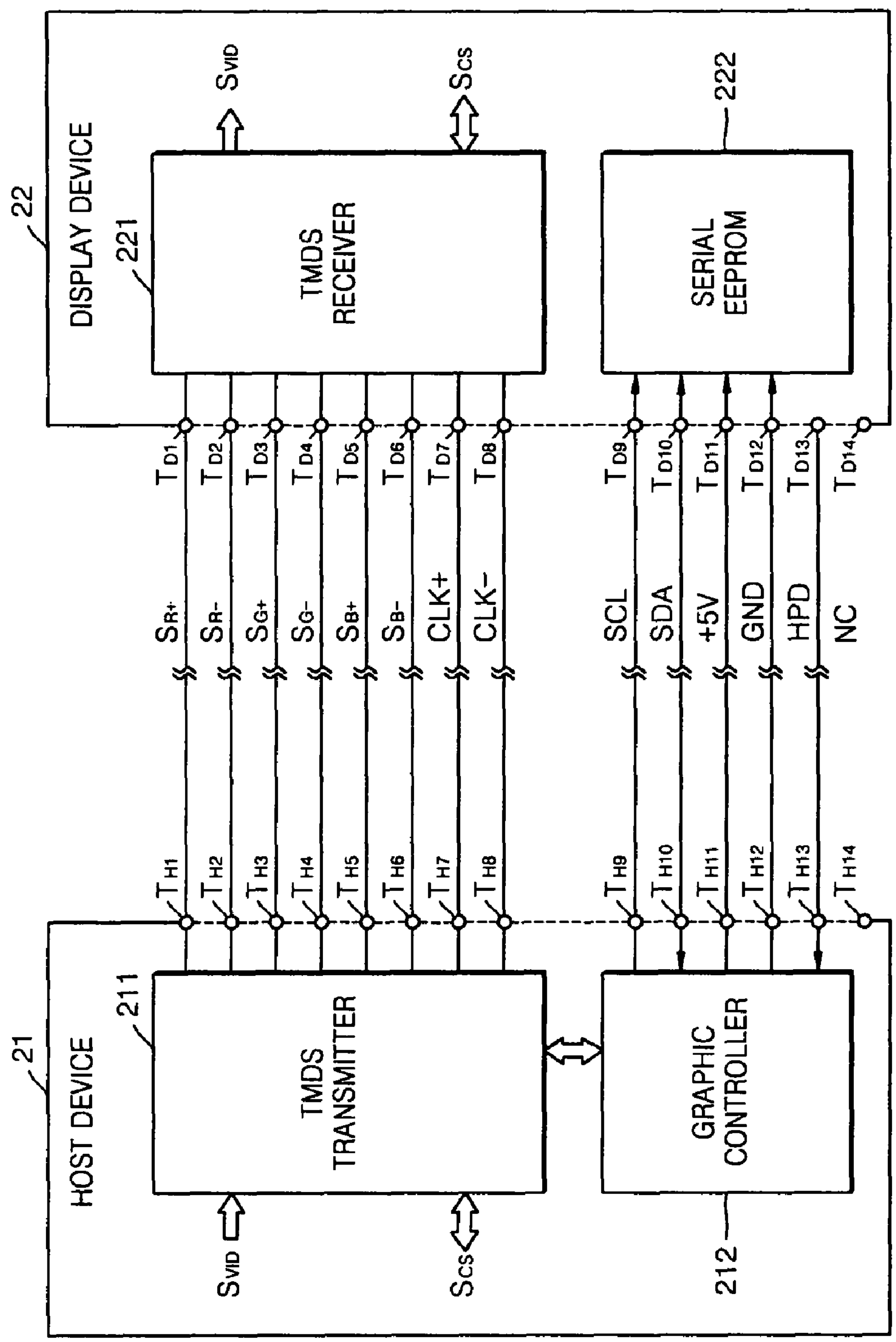
FIG. 2 illustrates a conventional digital image transmission system in a digital visual interface (DVI) format.
Figure 3:
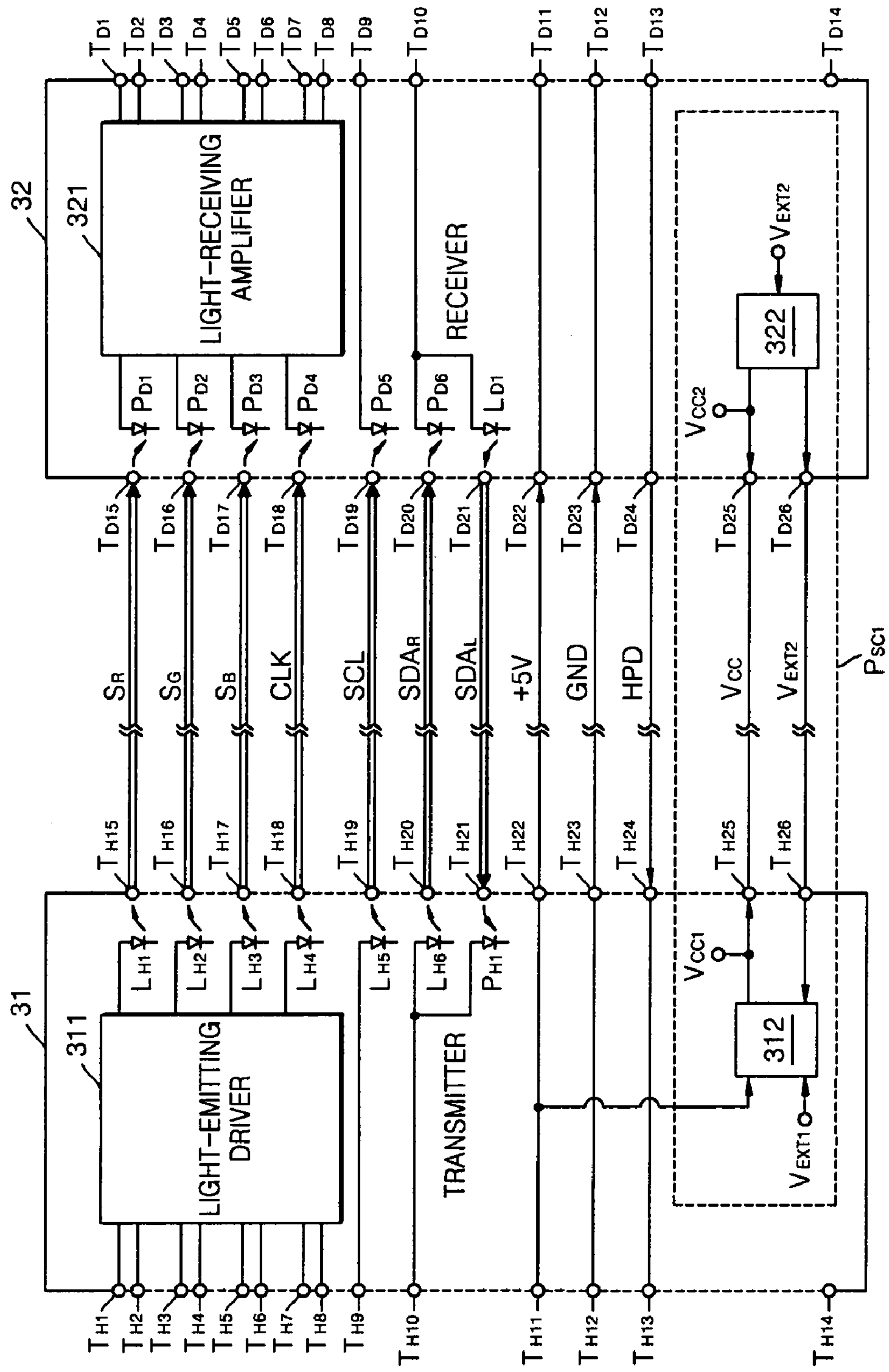
FIG. 3 illustrates an optical cable module as a transmission and reception reinforcement device interposed between a host device and a display device of FIG. 1 or 2, according to an embodiment of the present invention.

FIG. 3 illustrates an optical cable module as a transmission and reception reinforcement device interposed between a host device and a display device of FIG. 1 or 2, according to an embodiment of the present invention. In FIG. 3, like reference numerals as those of FIG. 1 or 2 denote elements having same functions. The conventional digital image transmission system of FIG. 1 or 2 described above is applied to the present embodiment of the present invention and thus, a description thereof will be omitted.

Referring to FIG. 3, the transmission and reception reinforcement device of the digital image transmission system according to the present embodiment of the present invention is an optical cable module comprising optical cables $T_{H15}$ to $T_{D15}$ through $T_{H21}$ to $T_{D21}$, a transmitter 31, a receiver 32, and a power supply circuit $P_{SC1}$. In FIG. 3, reference numerals $L_{H1}$ to $L_{H6}$ and $L_{D1}$ denote light-emitting diodes (LEDs), and $P_{D1}$ to $P_{D6}$ and $P_{H1}$ denote light-receiving diodes.

The transmitter 31 converts digital image data $S_{R+}$ to CLK−, a clock signal SCL for $I^2C$ communication, and data SDA output by the host device 11 or 21 into optical signals $S_R$ to $SDA_R$ by using a light-emitting driver 311 to transmit the optical signals $S_R$ to $SDA_R$ through the optical cables $T_{H15}$-$T_{D15}$ to $T_{H21}$-$T_{D21}$ (wherein it is clear from FIG. 3 that "$T_{H15}$-$T_{D15}$" is a one cable and not two separate cables), and converts data $SDA_L$ for $I^2C$ communication output by the optical cable $T_{H21}$-$T_{D21}$ into electrical signals and transmits the electrical signals to a host device (11 or 21 of FIG. 1 or 2).

The receiver 32 converts the optical signals $S_R$ to $SDA_R$ received through the optical cables $T_{H15}$-$T_{D15}$ to $T_{H20}$-$T_{D20}$ into digital image data $S_{R+}$ to CLK−, a clock signal SCL for $I^2C$ communication and data SDA by using a light-receiving amplifier 321 and transmits the digital image data $S_{R+}$ to CLK−, the clock signal SCL for $I^2C$ communication, and data SDA to a display device (12 or 22 of FIG. 1 or 2). In addition, the receiver 32 converts data SDA for $I^2C$ communication output by the display device (12 or 22 of FIG. 1 or 2) into an optical signal $SDA_L$ and transmits the optical signal $SDA_L$ through the optical cable $T_{H21}$-$T_{D21}$.

The power supply circuit $P_{SC1}$ comprises a first power supply unit 312 supplying power to the transmitter 31, and a second power supply unit 322 supplying power to the receiver 32. First and second power output terminals $V_{CC1}$ and $V_{CC2}$ of the first and second power supply units 312 and 322 are connected to each other. External-power supply voltages $V_{EXT1}$ and $V_{EXT2}$ respectively input to the first and second power supply units 312 and 322 are output from the first and second power output terminals $V_{CC1}$ and $V_{CC2}$.

When all of the external-power supply voltages $V_{EXT1}$ and $V_{EXT2}$ input to the first and second power supply units 312 and 322 are lower than a predetermined voltage, an internal-power supply voltage +5 V from a communication line between the host device 11 or 21 and the display device 12 or 22 in one of the first and second power supply units 312 and 322 is output from the first and second power supply output terminals $V_{CC1}$ and $V_{CC2}$.

As described above, the first and second power supply output terminals $V_{CC1}$ and $V_{CC2}$ of the first and second power supply units 312 and 322 are connected to each other. As such, although there is a difference between the first external-power supply voltage $V_{EXT1}$ supplied to the transmitter 31 and the second external-power supply voltage $V_{EXT2}$ supplied to the receiver 32, the one having higher voltage of the first external-power supply voltage $V_{EXT1}$ and the second external-power supply voltage $V_{EXT2}$ is supplied to each of the transmitter 31 and the receiver 32, such that the operation of the transmitter 31 and the operation of the receiver 32 can be balanced. Thus, data collision between the transmitter 31 and the receiver 32 can be prevented.

As described above, when all of the external-power supply voltages $V_{EXT1}$ and $V_{EXT2}$ input to the first and second power supply units 312 and 322 are lower than the predetermined voltage, the transmitter 31 and the receiver 32 of the transmission and reception reinforcement device operate due to the internal-power supply voltage +5 V. As such, even if an external power supply of the transmission and reception reinforcement device is weakened or cut off, transmission of digital image data can be smoothly performed.

Figure 4:
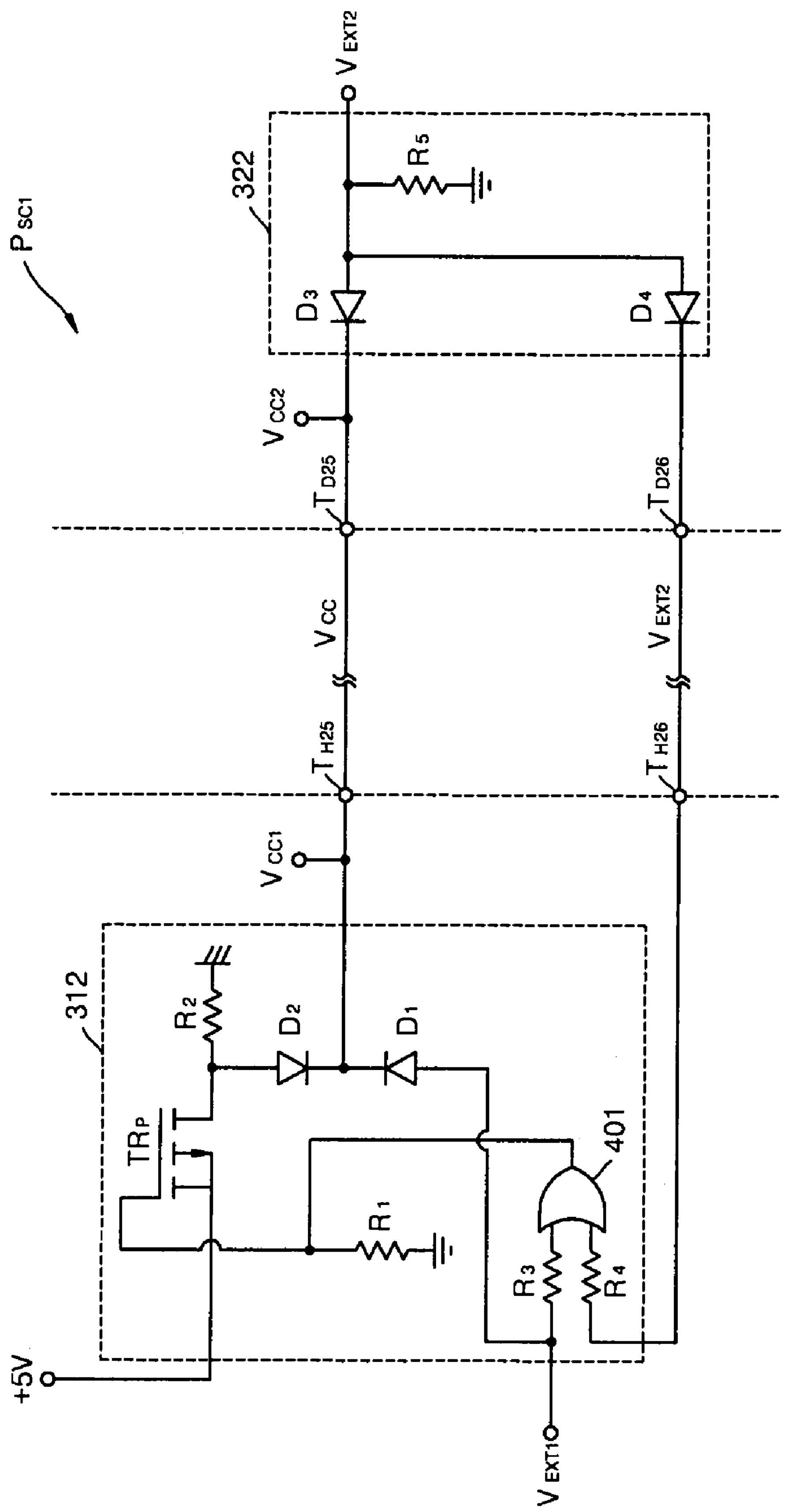
FIG. 4 illustrates a power supply circuit included in the transmission and reception reinforcement device of FIG. 3 in detail.

FIG. 4 illustrates a power supply circuit $P_{SC1}$ included in the transmission and reception reinforcement device of FIG. 3 in detail. Like reference numerals as those of FIG. 3 denote elements having the same function. Reference numerals $R_1$ to $R_5$ of FIG. 4 denote resistors for setting voltage. The power supply circuit $P_{SC1}$ will now be described with reference to FIGS. 1 through 4 in detail.

In the first power supply unit 312, the first external-power voltage $V_{EXT1}$ is output to the first power output terminal $V_{CC1}$ from a first diode $D_1$. The internal-power supply voltage +5 V generated in the host device 11 or 21 is output to the first power output terminal $V_{CC1}$ through a p-channel field effect transistor $TR_P$ as a switching transistor and a second diode $D_2$.

Here, when all of the first and second external-power supply voltages $V_{EXT1}$ and $V_{EXT2}$ input to the first and second power supply units 312 and 322 are lower than the predetermined voltage, the p-channel field effect transistor $TR_P$ is turned on.

In the second power supply unit 322, the second external-power voltage $V_{EXT2}$ is output to the second power output terminal $V_{CC2}$ through a third diode $D_3$ and is transmitted to the first power supply unit 312 through a fourth diode $D_4$.

The first and second power output terminals $V_{CC1}$ and $V_{CC2}$ of the first and second power supply units 312 and 322 are connected to each other.

In the first power supply unit 312, the internal-power supply voltage +5 V generated in the host device (11 or 21 of FIG. 1 or 2) is applied to a source of the p-channel field effect transistor $TR_P$. An anode of the second diode $D_2$ is connected to a drain of the p-channel field effect transistor $TR_P$.

The first external-power supply voltage $V_{EXT1}$ and the second external-power supply voltage $V_{EXT2}$ generated by the second power supply unit 322 are connected to a gate of the p-channel field effect transistor $TR_P$ through an OR gate 401. As such, when all of the first and second external-power supply voltages $V_{EXT1}$ and $V_{EXT2}$ input to the first and second power supply units 312 and 322 are lower than the predetermined voltage, the internal-power supply voltage +5 V is output to the first power output terminal $V_{CC1}$ through the p-channel field effect transistor $TR_P$ and the second diode $D_2$.

MODE OF THE INVENTION

Figure 5:
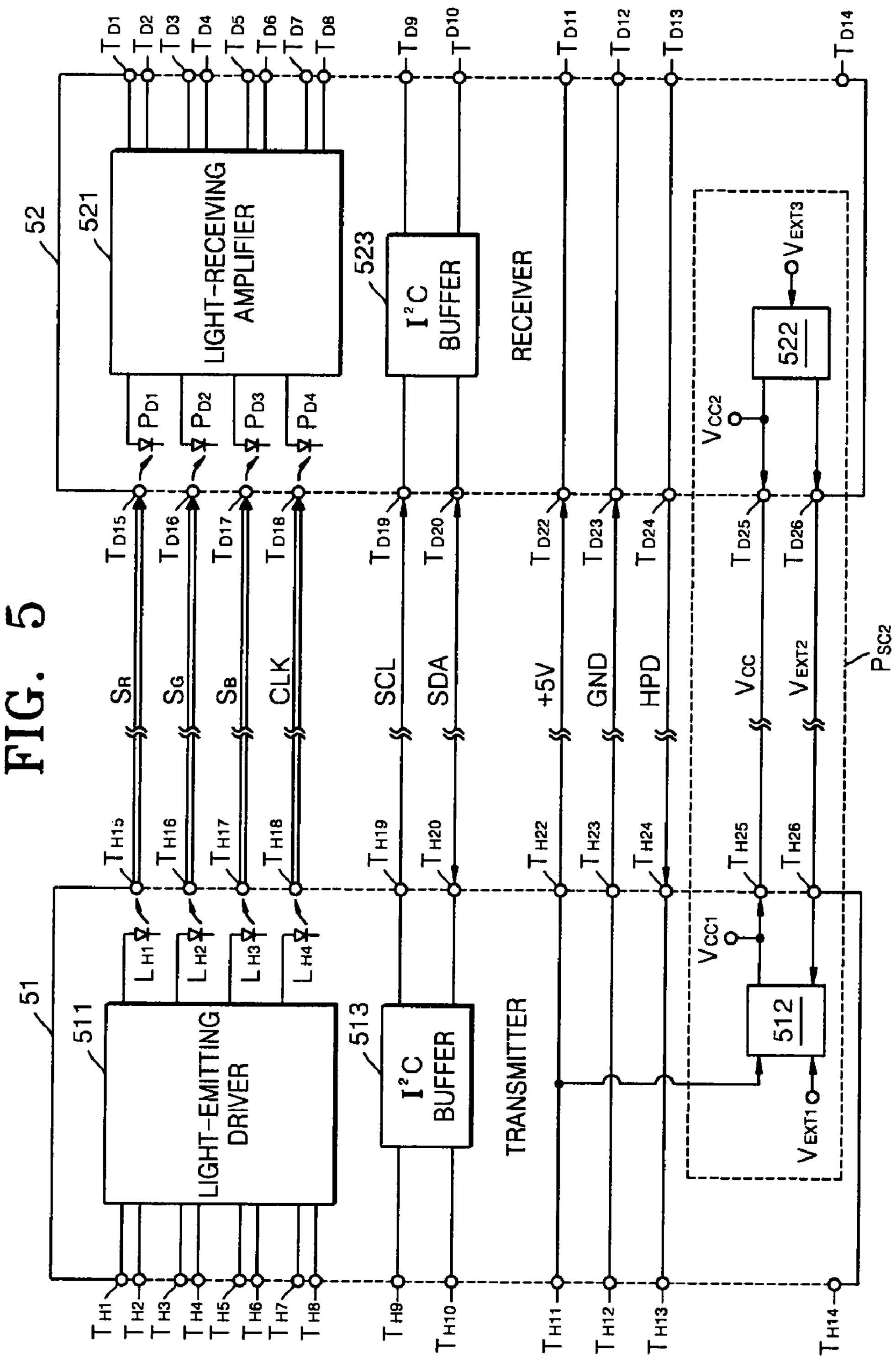
FIG. 5 illustrates an optical cable module as a transmission and reception reinforcement device interposed between a host device and a display device of FIG. 1 or 2, according to another embodiment of the present invention.

FIG. 5 illustrates an optical cable module as a transmission and reception reinforcement device interposed between a host device (11 or 21 of FIG. 1 or 2) and a display device (12 or 22 of FIG. 1 or 2), according to another embodiment of the present invention. Like reference numerals as those of FIG. 3 denote elements having same functions. The configuration and operation of a power supply circuit $P_{SC2}$ are the same as described with reference to FIGS. 3 and 4. The internal configuration of a first power supply unit 512 of FIG. 5 is the same as the first power supply unit 312 of FIG. 4. The internal configuration of a second power supply unit 522 of FIG. 5 is the same as the second power supply unit 322 of FIG. 4. Thus, only differences between FIGS. 3 and 5 will now be described.

The transmission and reception reinforcement device in the digital image transmission system according to the present embodiment of the present invention is an optical cable module comprising optical cables $T_{H15}$-$T_{D15}$ to $T_{H18}$-$T_{D18}$, a transmitter 51, and a receiver 52.

The transmitter 51 converts 8 channels of digital image data $S_{R+}$ to CLK− output by the host device (11 or 21 of FIG. 1 or 2) into 4 channels of optical signals $S_R$ to CLK by using a light-emitting driver 511 and transmits the optical signals $S_R$ to CLK through the optical cables $T_{H15}$-$T_{D15}$ to $T_{H18}$-$T_{D18}$, buffers a clock signal SCL for $I^2C$ communication and data SDA output by the host device (11 or 21 of FIG. 1 or 2) by using an $I^2C$ buffer 513 and transmits the buffered clock signal SCL for $I^2C$ communication and data SDA through electrical cables $T_{H19}$-$T_{D19}$ and $T_{H20}$-$T_{D20}$, and buffers data SDA for $I^2C$ communication output through the electrical cable $T_{H20}$-$T_{D20}$ and transmits the buffered data SDA for $I^2C$ communication to the host device (11 or 21 of FIG. 1 or 2).

The receiver 52 converts 4 channels of optical signals $S_R$ to CLK output through the optical cables $T_{H15}$-$T_{D15}$ to $T_{H18}$-$T_{D18}$ into 8 channels of digital image data $S_{R+}$ to CLK− by using a light-receiving amplifier 521 and transmits the 4 channels of optical signals $S_R$ to CLK to the display device (12 or 22 of FIG. 1 or 2), buffers a clock signal SCL for $I^2C$ communication and data SDA output through the electrical cable $T_{H20}$-$T_{D20}$ by using an $I^2C$ buffer 623 and transmits the buffered clock signal SCL for $I^2C$ communication and data SDA to the display device (12 or 22 of FIG. 1 or 2), and buffers data SDA for $I^2C$ communication output by the display device (12 or 22 of FIG. 1 or 2) by using the $I^2C$ buffer 623 and transmits the buffered data SDA for $I^2C$ communication through the electrical cable $T_{H20}$-$T_{D20}$.

Figure 6:
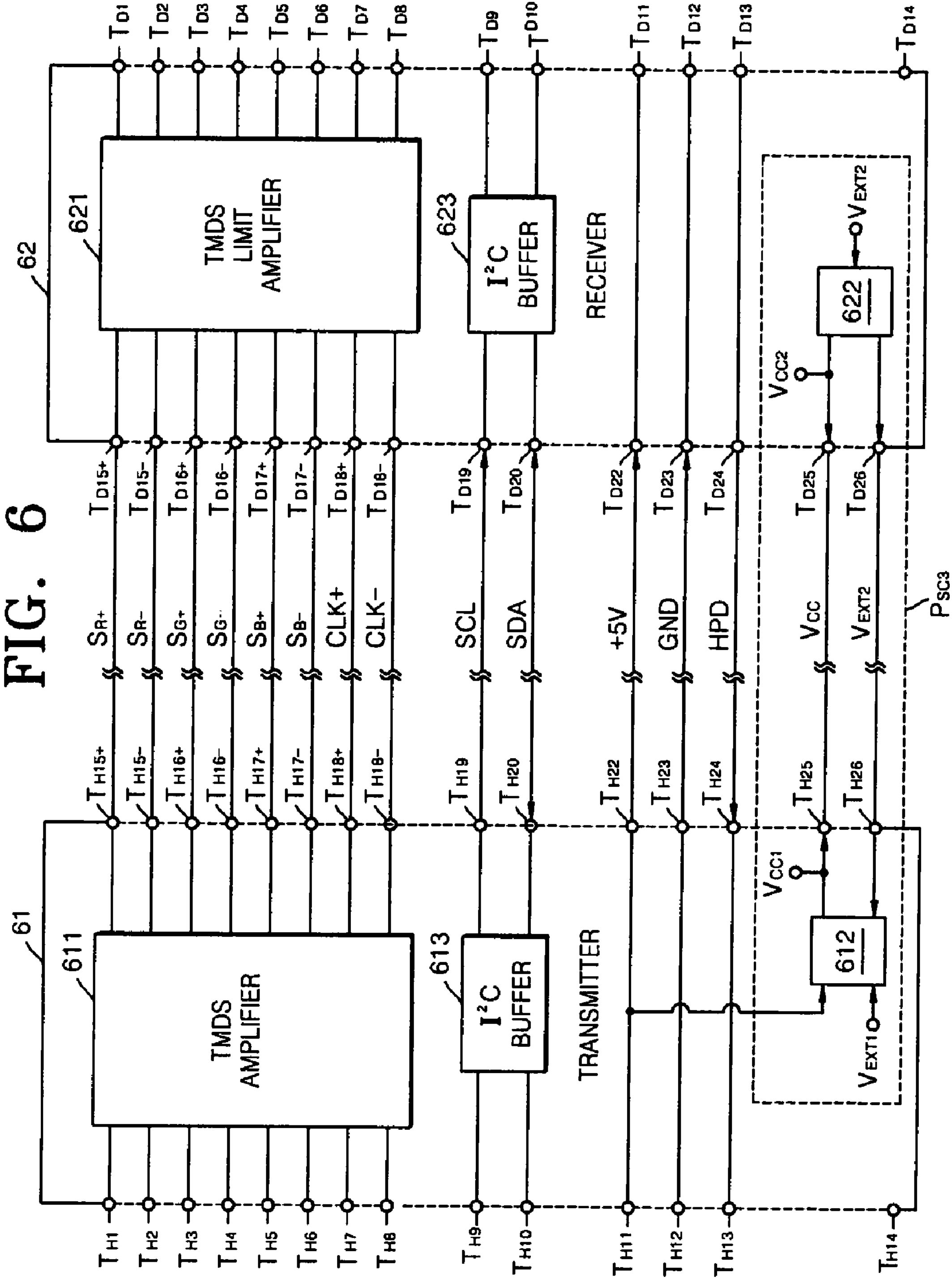
FIG. 6 illustrates a repeater as a transmission and reception reinforcement device interposed between a host device and a display device of FIG. 1 or 2, according to another embodiment of the present invention.

FIG. 6 illustrates a repeater as a transmission and reception reinforcement device interposed between a host device and a display device of FIG. 1 or 2, according to another embodiment of the present invention. Like reference numerals as those of FIG. 3 denote elements having the same function. The configuration and operation of a power supply circuit $P_{SC3}$ are the same as described with reference to FIGS. 3 and 4. The internal configuration of a first power supply unit 612 of FIG. 6 is the same as the first power supply unit 312 of FIG. 4. The internal configuration of a second power supply unit 622 of FIG. 6 is the same as the second power supply unit 322 of FIG. 4. Thus, only differences between FIGS. 3 and 6 will now be described.

The transmission and reception reinforcement device in the digital image transmission system according to the present embodiment of the present invention is a repeater comprising a transmitter 61 and a receiver 62.

The transmitter 61 amplifies 8 channels of digital image data $S_{R+}$ to CLK− output by the host device (11 or 21 of FIG. 1 or 2) by using a TMDS amplifier 611 and transmits the digital image data $S_R$ to CLK− through the electrical cables $T_{H15}$-$T_{D15}$ to $T_{H18}$-$T_{D18}$, buffers a clock signal SCL for $I^2C$ communication and data SDA output by the host device (11 or 21 of FIG. 1 or 2) by using an $I^2C$ buffer 613 and transmits the buffered clock signal SCL for $I^2C$ communication and data SDA through electrical cables $T_{H19}$-$T_{D19}$ and $T_{H20}$-$T_{D20}$, and buffers data SDA for $I^2C$ communication output through the electrical cable $T_{H20}$-$T_{D20}$ to transmit buffered data SDA for $I^2C$ communication to the host device (11 or 21 of FIG. 1 or 2).

The receiver 62 limitedly amplifies digital image data $S_R$ to CLK− output through the electrical cables $T_{H15}$-$T_{D15}$ to $T_{H15}$-$T_{D18}$ by using a TMDS limit amplifier 621 and transmits digital image data $S_R$ to CLK− to the display device (12 or 22 of FIG. 1 or 2), buffers data SDA and a clock signal SCL for $I^2C$ communication output through the electrical cables $T_{H15}$-$T_{D15}$ to $T_{H18}$-$T_{D18}$ by using an $I^2C$ buffer 623 and transmits the buffered clock signal SCL for $I^2C$ communication and data SDA to the display device (12 or 22 of FIG. 1 or 2), and buffers data SDA for $I^2C$ communication output by the display device (12 or 22 of FIG. 1 or 2) by using the $I^2C$ buffer 623 and transmits the buffered data SDA for $I^2C$ communication though the electrical cable $T_{H20}$-$T_{D20}$.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

As described above, in the digital image transmission system according to the present invention, power output terminals of first and second power supply units of a transmission and reception reinforcement device are connected to each other. As such, even if there is a difference between a first external-power supply voltage supplied to a transmitter and a second external-power supply voltage supplied to a receiver, the one having higher voltage of the first external-power supply voltage and the second external-power supply voltage is supplied to each of the transmitter and the receiver, such that the operation of the transmitter and the operation of the receiver can be balanced. Thus, data collision between the transmitter and the receiver can be prevented.

When all of external-power supply voltages input to the first and second power supply units are lower than a predetermined voltage, the transmitter and the receiver of the transmission and reception reinforcement device operate due to an internal-power supply voltage. As such, even if an external power supply of the transmission and reception reinforcement device is weakened or cut off, transmission of digital image data can be smoothly performed.

The invention claimed is:

1. A digital image transmission system comprising a host device, a transmission and reception reinforcement device, and a display device, the host device transmitting digital image data to the display device by using the transmission and reception reinforcement device, wherein the transmission and reception reinforcement device comprises a transmitter, a receiver, and a power supply circuit, and the power supply circuit comprises a first power supply unit supplying power to the transmitter and a second power supply unit supplying power to the receiver, and power output terminals of the first and second power supply units are connected to each other, and external-power supply voltages respectively input to the first and second power supply units are output to the power output terminals, and when all of the external-power supply voltages input to the first and second power supply units are lower than a predetermined voltage, an internal-power supply voltage present in a communication line between the host device and the display device is output to the power output terminals.

2. The system of claim 1, wherein, in the transmission and reception reinforcement device, the transmitter is coupled to the host device, and the receiver is coupled to the display device, and a communication line is connected between the transmitter and the receiver.

3. The system of claim 1, wherein, in the first power supply unit, a first external-power supply voltage is output to a first power output terminal through a first diode, and an internal-power supply voltage generated in the host device is output to the first power output terminal through a switching transistor and a second diode, and when all of external-power supply voltages input to the first and second power supply units are lower than a predetermined voltage, the switching transistor is turned on.

4. The system of claim 3, wherein, in the second power supply unit, a second external-power supply voltage is output to a second power output terminal through a third diode, and the second external-power supply voltage is transmitted to the first power supply unit through a fourth diode.

5. The system of claim 4, wherein, in the first power supply unit, the switching transistor is a p-channel field effect transistor, and an internal-power supply voltage generated in the host device is applied to a source of the p-channel field effect transistor, and an anode of the second diode is connected to a drain of the p-channel field effect transistor.

6. The system of claim 5, wherein, in the first power supply unit, the first external-power supply voltage and the second external-power supply voltage supplied by the second power supply unit are connected to a gate of the p-channel field effect transistor through an OR gate.

7. The system of claim 1, wherein extended display identification data (EDID) of the display device is transmitted to the host device by using the transmission and reception reinforcement device according to Inter-Integrated Circuit ($I^2C$) communication protocol, and the host device transmits digital image data to the display device according to EDID.

8. The system of claim 7, wherein the host device comprises:

a high definition multimedia interface (HDMI) transmitter converting audio data, a clock signal, and digital image data into transition minimized differential signalling (TMDS) signals according to an HDMI format and transmitting the converted audio data, the clock signal, and digital image data to the transmission and reception reinforcement device; and a graphic controller controlling an operation of the HDMI transmitter according to EDID, and the display device comprises:

a memory storing EDID and providing EDID to the graphic controller of the host device according to $I^2C$ communication protocol; and an HDMI receiver restoring TMDS signals received from the transmission and reception reinforcement device in an HDMI format into audio data, the clock signal, and digital image data.

9. The system of claim 7, wherein the host device comprises:

a TMDS transmitter converting a clock signal and digital image data into TMDS signals according to a digital visual interface (DVI) format and transmitting the converted clock signal and digital image data to the transmission and reception reinforcement device; and a graphic controller controlling an operation of the HDMI transmitter according to EDID, and the display device comprises:

a memory storing EDID and providing EDID to the graphic controller of the host device according to $I^2C$ communication protocol; and an HDMI receiver restoring TMDS signals received from the transmission and reception reinforcement device in the DVI format into the click signal and digital image data.

10. The system of claim 7, wherein an optical cable is disposed on a communication line between the transmitter and the receiver of the transmission and reception reinforcement device, and in the transmitter of the transmission and reception reinforcement device, digital image data generated in the host device and the clock signal for $I^2C$ communication and data are converted into optical signals and are transmitted through the optical cable, and data for $I^2C$ communication present in the optical cable is converted into an electrical signal and is transmitted to the host device, and in the receiver of the transmission and reception reinforcement device, optical signals present in the optical cable are converted into digital image data and the clock signal for $I^2C$ communication and data and are transmitted to the display device, and data for $I^2C$ communication generated in the display device is converted into an optical signal and is transmitted through the optical cable.

11. The system of claim 7, wherein an optical cable is disposed on a communication line between the transmitter and the receiver of the transmission and reception reinforcement device, and in the transmitter of the transmission and reception reinforcement device, digital image data generated in the host device is converted into optical signals and is transmitted through the optical cable, and a clock signal for $I^2C$ communication and data generated in the host device are buffered and are transmitted through an electrical cable, and data for $I^2C$ communication present in the electrical cable is buffered and is transmitted to the host device, and in the receiver of the transmission and reception reinforcement device, optical signals generated in the optical cable are converted into digital image data and are transmitted to the display device, and a clock signal for $I^2C$ communication and data present in the electrical cable are buffered and are transmitted to the display device, and data for $I^2C$ communication generated in the display device is buffered and is transmitted through the electrical cable.

12. The system of claim 7, wherein, in the transmitter of the transmission and reception reinforcement device, digital image data generated in the host device is amplified and is transmitted through the electrical cable, and the clock signal for $I^2C$ communication and data generated in the host device are buffered and are transmitted through the electrical cable, and data for $I^2C$ communication present in the electrical cable is buffered and is transmitted to the host device, and in the receiver of the transmission and reception reinforcement device, digital image data present in the electrical cable is amplified and is transmitted to the display device, and the clock signal for $I^2C$ communication and data present in the electrical cable are buffered and are transmitted to the display device, and data for $I^2C$ communication generated in the display device is buffered and is transmitted through the electrical cable.

* * * * *